US012808986B2

(12) United States Patent
Kopytjuk et al.

(10) Patent No.: US 12,808,986 B2
(45) Date of Patent: Nov. 24, 2026

(54) METHOD AND DEVICE FOR RECOGNIZING MISALIGNMENTS OF A STATIONARY SENSOR AND STATIONARY SENSOR

(71) Applicant: Robert Bosch GmbH, Stuttgart (DE)

(72) Inventors: Marat Kopytjuk, Heilbronn (DE); Joachim Boerger, Friedrichshafen (DE); Matthias Ehm, Hildesheim (DE); Yann-Ael Muller, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 348 days.

(21) Appl. No.: 18/175,667

(22) Filed: Feb. 28, 2023

(65) Prior Publication Data

US 2023/0314564 A1 Oct. 5, 2023

(30) Foreign Application Priority Data

Apr. 1, 2022 (DE) ..................... 10 2022 203 289.6

(51) Int. Cl.

| | |
|---|---|
| ***G01S 7/40*** | (2006.01) |
| ***G01S 7/497*** | (2006.01) |
| ***G01S 13/89*** | (2006.01) |
| ***G01S 17/89*** | (2020.01) |

(52) U.S. Cl.

CPC .......... *G01S 7/4039* (2021.05); *G01S 7/4021* (2013.01); *G01S 7/4972* (2013.01); *G01S 13/89* (2013.01); *G01S 17/89* (2013.01)

(58) Field of Classification Search

CPC .... G01S 7/4039; G01S 7/4021; G01S 7/4972; G01S 13/89; G01S 17/89

USPC .......................................................... 342/165

See application file for complete search history.

(56) References Cited

U.S. PATENT DOCUMENTS

| | | | | |
|---|---|---|---|---|
| 6,714,156 B1 * | 3/2004 | Ibrahim | ................ | G01S 7/4026 342/174 |
| 2012/0235851 A1 * | 9/2012 | Park | ...................... | G01S 7/4052 342/70 |
| 2013/0218398 A1 * | 8/2013 | Gandhi | ................. | G01S 13/931 701/31.1 |

(Continued)

FOREIGN PATENT DOCUMENTS

| | | | |
|---|---|---|---|
| DE | 102019209154 A1 | 12/2020 | |
| DE | 102019132150 A1 * | 5/2021 | |
| WO | WO-2020101071 A1 * | 5/2020 | ............ G01S 17/86 |

OTHER PUBLICATIONS

Otake. "Automotive Radar for Localization in GNSS—Denied Environments," KTH Royal Institute of Technology, 2021 (Year: 2012).*

(Continued)

*Primary Examiner* — Samarina Makhdoom

(74) *Attorney, Agent, or Firm* — NORTON ROSE FULBRIGHT US LLP

(57) ABSTRACT

A method for recognizing misalignments of a stationary sensor. A first occupancy map is generated based on first sensor data, which the sensor generates at a first point in time. Based on second sensor data, which the sensor generates at a second point in time, a second occupancy map is generated. A cross-correlation of the first occupancy map and of the second occupancy map is calculated. A misalignment of the sensor is recognized based on the calculated cross-correlation.

12 Claims, 5 Drawing Sheets

(56) References Cited

U.S. PATENT DOCUMENTS

| | | | | |
|---|---|---|---|---|
| 2015/0276923 | A1* | 10/2015 | Song | G01S 13/931<br>702/97 |
| 2016/0161597 | A1* | 6/2016 | Treptow | G01S 13/424<br>342/174 |
| 2019/0178654 | A1* | 6/2019 | Hare | G06T 7/70 |
| 2020/0158820 | A1* | 5/2020 | Ikram | G01S 13/06 |
| 2021/0364638 | A1* | 11/2021 | Sakata | G06V 20/58 |

OTHER PUBLICATIONS

Zhang et al. "A novel method for Calibration and Verification of Roadside Millimetre-wave radar," IET Intell. Transp. Syst. 2022;16:408-419 Nov. 16, 2021 (Year: 2022).*

* cited by examiner

METHOD AND DEVICE FOR RECOGNIZING MISALIGNMENTS OF A STATIONARY SENSOR AND STATIONARY SENSOR

CROSS REFERENCE

The present application claims the benefit under 35 U.S.C. § 119 of German Patent Application No. DE 10 2022 203 289.6 filed on Apr. 1, 2022, which is expressly incorporated herein by reference in its entirety.

FIELD

The present invention relates to a method and to a device for recognizing misalignments of a stationary sensor and to a stationary sensor.

BACKGROUND INFORMATION

Radar and LIDAR sensors play an important role in the provision of surroundings data which are evaluated by driver assistance systems of a motor vehicle. In particular, during autonomous driving, precise knowledge of the positions and velocities of objects in the surroundings relative to the vehicle is essential.

In addition to sensors, which are directly installed in the motor vehicle and therefore are movable, stationary sensors are also available, which are provided on the infrastructure side, for example. A method for generating a surroundings model for an autonomously controlled vehicle is described in German Patent Application No. DE 10 2019 209 154 A1. For this purpose, sensor data are detected by a multitude of infrastructure-side sensors in a surrounding area of the vehicle.

The knowledge about the precise alignment and position of stationary radar or LIDAR sensors is crucial for applications from the field of infrastructure sensor systems. A misalignment of a few degrees or centimeters may result in erroneous conclusions, in particular, at larger distances. For example, a mix-up of traffic lanes of a recognized road user is to be avoided in the context of automated driving.

Misalignments, in general, occur due to weather conditions or due to external influences, such as collisions. It is desirable to recognize and correct such misalignments.

The detection and the correction of misalignments may take place based on so-called landmarks, these often being stationary objects or items in the visual range of a sensor. The position of the landmarks is part of the documentation during the installation of a sensor. When the sensor changes its position due to weather conditions or other external influences, the distance from one or multiple landmark(s) changes. Based on this change, a misalignment is diagnosed or corrected. Typical landmarks are roadway markings, buildings, and highly reflective metallic objects, such as signs.

SUMMARY

The present invention provides a method and a device for recognizing misalignments of a stationary sensor as well as a stationary sensor.

Preferred specific example embodiments of the present invention are disclosed herein.

According to a first aspect, the present invention relates to a method for recognizing misalignments of a stationary sensor.

According to an example embodiment of the present invention, based on first sensor data, which the sensor generates at a first point in time, a first occupancy map is generated. Based on second sensor data, which the sensor generates at a second point in time, a second occupancy map is generated. A cross-correlation of the first occupancy map and of the second occupancy map is calculated. A misalignment of the sensor is recognized based on the calculated cross-correlation.

According to a second aspect, the present invention relates to a device for recognizing misalignments of a stationary sensor. According to an example embodiment of the present invention, an interface is designed to receive sensor data from the sensor. A processing unit is designed to generate a first occupancy map based on first sensor data, which the sensor generates at a first point in time. The processing unit is furthermore designed to generate a second occupancy map based on second sensor data, which the sensor generates at a second point in time. The processing unit is furthermore designed to calculate a cross-correlation of the first occupancy map and of the second occupancy map, and to recognize a misalignment of the sensor based on the calculated cross-correlation.

According to a third aspect, the present invention relates to a stationary sensor. According to an example embodiment of the present invention, the sensor is a radar sensor or a LIDAR sensor, and includes a device according to the present invention for recognizing misalignments of the stationary sensor.

According to an example embodiment of the present invention, a first occupancy map and a second occupancy map are generated and compared to one another based on a cross-correlation. The first occupancy map is generated based on sensor data which were generated at an initial first point in time. In this way, the occupancy may be ascertained at a reference point in time, for example directly after the installation of the sensor. The second occupancy map may be generated at the second point in time, which may be during the normal operation of the sensor. If, during the time period between the first point in time and the second point in time, the position and/or alignment of the sensor is/are changed relative to the original position and/or alignment due to vibrations, collisions or other effects, this can be recognized. Preferably, both displacements of the sensor and changes of the orientation of the sensor may be recognized.

Within the meaning of the present invention, a misalignment of the sensor may thus be understood to mean that the instantaneous position and/or alignment of the sensor, i.e., at the second point in time, differs from the initial alignment of the sensor, i.e., at the first point in time.

Within the meaning of the present invention, an occupancy map may be understood as a two-dimensional or three-dimensional map, which may include a grid, for example. For each cell of the grid, its estimated occupancy probability by one or multiple object(s) based on the sensor data may be entered. In some specific embodiments, only a binary value is predefined for each cell of the grid, for example a value "0" corresponding to the state "unoccupied," and a value "1" corresponding to the state "occupied."

The recognition of the misalignments of the sensor is independent of the physical operating mode of a sensor. Furthermore, no landmarks are required.

The method according to an example embodiment of the present invention for recognizing the misalignments of the sensor is robust against occlusions and clutter, i.e., noise. The method is also robust in the case of new objects in the scene since the cross-correlation ascertains the similarity as a function of the displacement of the present occupancy map relative to the initially recorded occupancy map.

According to one preferred refinement of the method of the present invention for recognizing misalignments of the stationary sensor, the sensor is a radar sensor, a LIDAR sensor, an ultrasonic sensor, or a 3D camera sensor.

According to one preferred refinement of the method of the present invention for recognizing misalignments of the stationary sensor, the sensor is integrated into the traffic infrastructure.

According to one preferred refinement of the method of the present invention for recognizing misalignments of the stationary sensor, a spatial offset is calculated based on the calculated cross-correlation, the misalignment of the sensor being recognized based on the spatial offset. A displacement and/or twisting of the sensor translates directly into an offset, so that the misalignment may be precisely recognized by ascertaining the offset.

According to one preferred refinement of the method of the present invention for recognizing misalignments of the stationary sensor, the misalignment of the sensor is recognized if the spatial offset is greater than a predefined threshold value.

According to one preferred refinement of the method of the present invention for recognizing misalignments of the stationary sensor, a calibration of the sensor for compensating for the misalignment is carried out based on the calculated spatial offset. In this way, a correction is possible since the displacement may be implicitly calculated.

According to one preferred refinement of the method of the present invention for recognizing misalignments of the stationary sensor, the cross-correlation is a multidimensional cross-correlation, i.e., an at least two-dimensional cross-correlation. A higher-dimensional cross-correlation may be used, for example, to recognize both twisting and position errors. If, as a result of the installation of the sensor, only a change in azimuth and elevation angles is to be expected, a two-dimensional cross-correlation may be used.

According to one specific example embodiment of the present invention, a six-dimensional cross-correlation is used. For calculating an optimum having six degrees of freedom, the solution space may be limited in one possible variant in that, e.g., it may be assumed that the error is in a maximum range, for example up to maximally 10 cm or max. 5°. If, within this limited area, no optimum of the cross-correlation is found, it is recognized that the error is so high that the reliability of the sensor may no longer be ensured. The sensor may, for example, be deactivated with a corresponding diagnostic message.

In one further possible variant, an optimization method is used, for example a gradient descent with random restarts.

According to one preferred refinement of the method of the present invention for recognizing misalignments of the stationary sensor, the first occupancy map and the second occupancy map are calculated in a polar representation.

According to one preferred refinement of the method of the present invention for recognizing misalignments of the stationary sensor, the first point in time, at which the sensor generates sensor data, is at night. In this case, the surroundings are as freely visible as possible, and the number of the road users is reduced as much as possible.

According to one preferred refinement of the method of the present invention for recognizing misalignments of the stationary sensor, the sensor generates the first sensor data and/or second sensor data over a time period of several seconds.

Further advantages, features and details of the present invention are derived from the following description in which various exemplary embodiments are described in detail, with reference to the figures.

Figure 1:
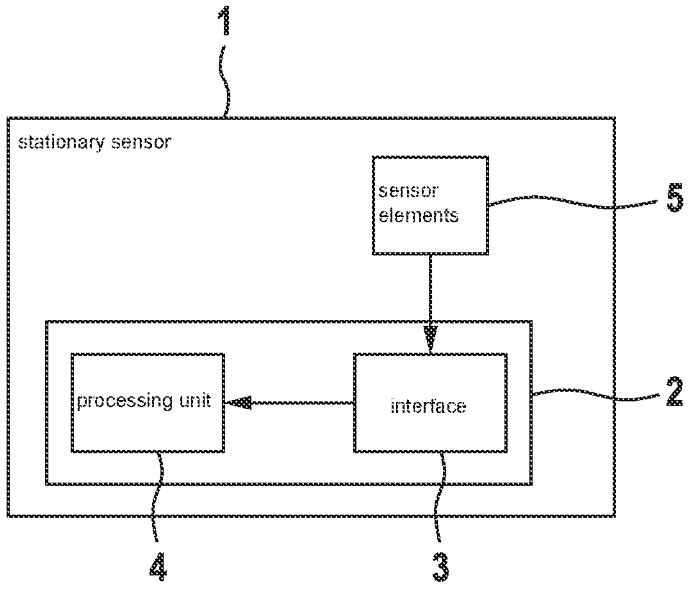
FIG. 1 shows a schematic block diagram of a stationary sensor including a device for recognizing misalignments of the stationary sensor according to one specific example embodiment of the present invention.

In all figures, identical or functionally identical elements and devices are denoted by the same reference numerals. The numbering of method steps is used for the sake of clarity and, in general, is not intended to imply a certain chronological order. In particular, multiple method steps may also be carried out simultaneously.

DETAILED DESCRIPTION OF EXAMPLE EMBODIMENTS

FIG. 1 shows a schematic block diagram of a stationary sensor 1 including a device 2 for recognizing misalignments of the stationary sensor 1. Stationary sensor 1 may be a radar sensor or a LIDAR sensor. However, in general, the stationary sensor may be any arbitrary type of sensor which detects point clouds, i.e., for example, also an ultrasonic sensor or a 3D camera sensor.

Sensor 1 includes sensor elements 5 which generate sensor data. In the case of a radar sensor, antenna elements may be provided, for example, which emit radar radiation according to a conventional radar method and receive the radar radiation reflected at objects. In the case of a LIDAR sensor, sensor elements 5 include a laser which scans the surroundings, as well as receivers to detect light which is reflected back.

The generated sensor data are transferred to an interface 3 of device 2. Interface 3 may be a hard-wired or wireless interface. The sensor data may also be stored in a memory which device 2 is able to access.

Device 2 furthermore includes a processing unit 4, which may include at least one microprocessor, microcontroller, integrated circuit, or the like. Processing unit 4 evaluates the sensor data. Processing unit 4 may generate occupancy maps based on the sensor data for this purpose. In the occupancy map, surroundings of the sensor are divided into a plurality of cells. Each cell is assigned an occupancy probability by processing unit 4 based on the sensor data. In the simplest case, only the values 0 (unoccupied) and 1 (occupied) may be assigned; however, according to further specific embodiments, a plurality of different occupancy probabilities between 0 and 1 are possible.

Processing unit 4 may be designed to extract the occupancy probability of one cell from the sensor data with the aid of signal processing, for example with the aid of filters. In this way, a cell may be assigned to each reflection detected based on the sensor data. For this purpose, associated location coordinates are calculated for the reflection, for example the distance and azimuth angle for a polar representation. According to further specific embodiments, it is also possible to ascertain three-dimensional location coordinates, i.e., for example, an elevation angle is additionally ascertained. The occupancy map is then three-dimensional.

For initialization, sensor elements 5 generate first sensor data at a first point in time. This point in time may be during or shortly after the installation of sensor 1. These first sensor data serving as reference data are generated in the process, after the sensor was physically aligned in the desired position. The first sensor data thus represent the best possible state. For example, the first point in time is at night since, at this point in time, only few interfering temporarily present objects (for example vehicles) are to be expected. The first sensor data may be generated over a time period of several seconds, for example at least 10 seconds. Larger time periods result in greater robustness. The measurement takes place in a manner that is as interference-free as possible. In particular, no further work is to be carried out at the location of the sensor, which could influence the alignment.

Processing unit 4 calculates a first occupancy map of the surroundings of sensor 1 based on the first sensor data. The first occupancy map serves as a reference for ascertaining the occupancy in the surroundings of sensor 1, while the sensor is correctly aligned.

Sensor 1 is then put into operation. At a second point in time, it is to be ascertained whether a misalignment of sensor 1 is present. For this purpose, sensor elements 5 generate second sensor data. The second sensor data may be generated over a time period of several seconds, for example at least 10 seconds. Processing unit 4 calculates a second occupancy map of the surroundings of sensor 1 based on the second sensor data.

Processing unit 4 furthermore calculates a cross-correlation of the first occupancy map and of the second occupancy map. For a two-dimensional occupancy map, this involves a two-dimensional function, which encompasses a convolution of the signal with respect to the first occupancy map and of the signal with respect to the second occupancy map. If a misalignment now occurs, the occupancy maps are then displaced and/or twisted relative to one another. Due to the convolution, this manifests itself in a shift (offset) of the cross-correlation, which processing unit 4 is able to ascertain.

For example, processing unit 4 may compare the offset to a threshold value. If the offset is greater than the predefined threshold value, processing unit 4 is able to recognize the misalignment of sensor 1. Otherwise, processing unit 4 recognizes that sensor 1 continues to be correctly aligned, at least within a tolerance range.

If processing unit 4 recognizes a misalignment of sensor 1, a warning signal may be output, for example to a user. Sensor 1 may then be manually realigned again. However, it is also possible to compensate for the misalignment of sensor 1. By shifting the sensor data by the offset, a calibration of sensor 1 may thus be carried out, resulting in corrected sensor data which correspond to the original position and/or alignment of sensor 1.

Figure 2:
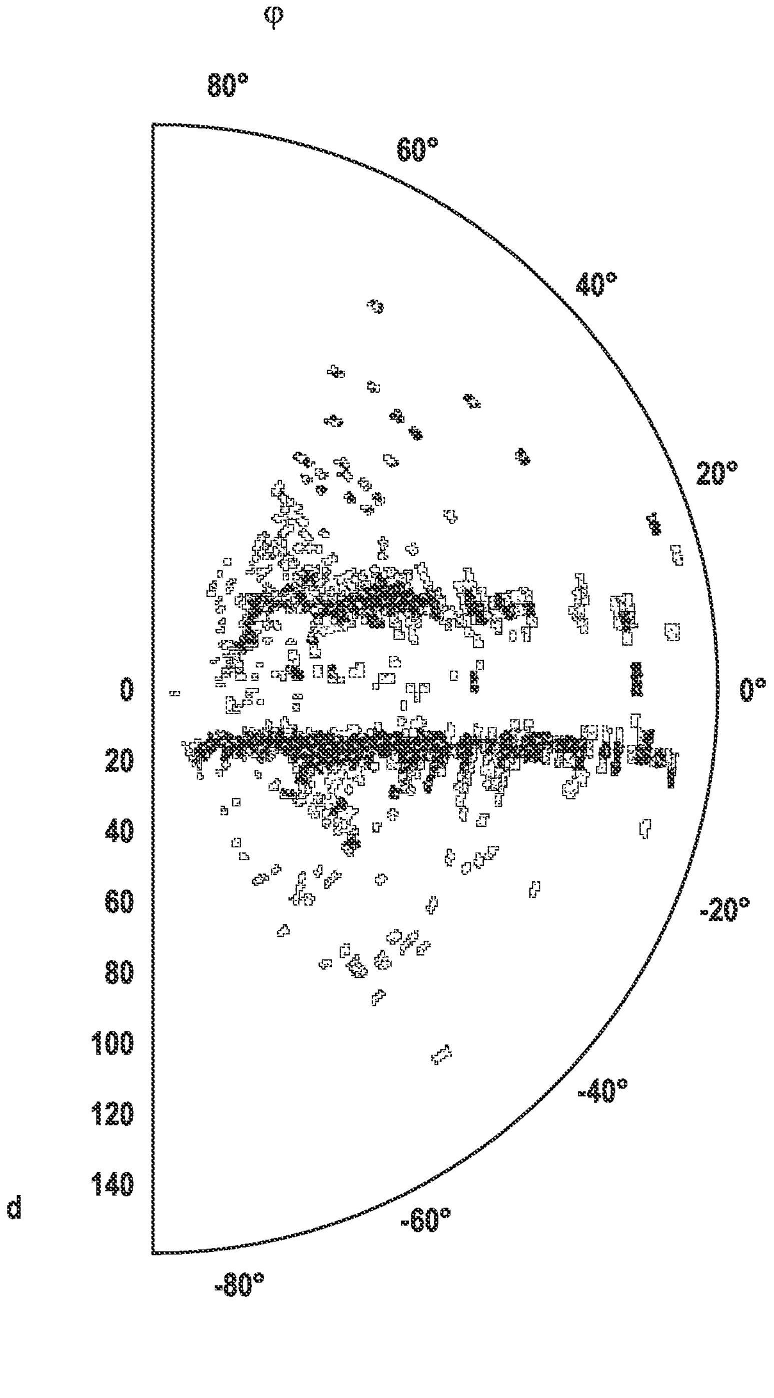
FIG. 2 shows an exemplary occupancy map at a first point in time, according to the present invention.

FIG. 2 shows an exemplary occupancy map at a first point in time. The occupancy map has been generated in a polar representation, the occupancy probabilities being ascertained for different distances d and azimuth angles cp.

Figure 3:
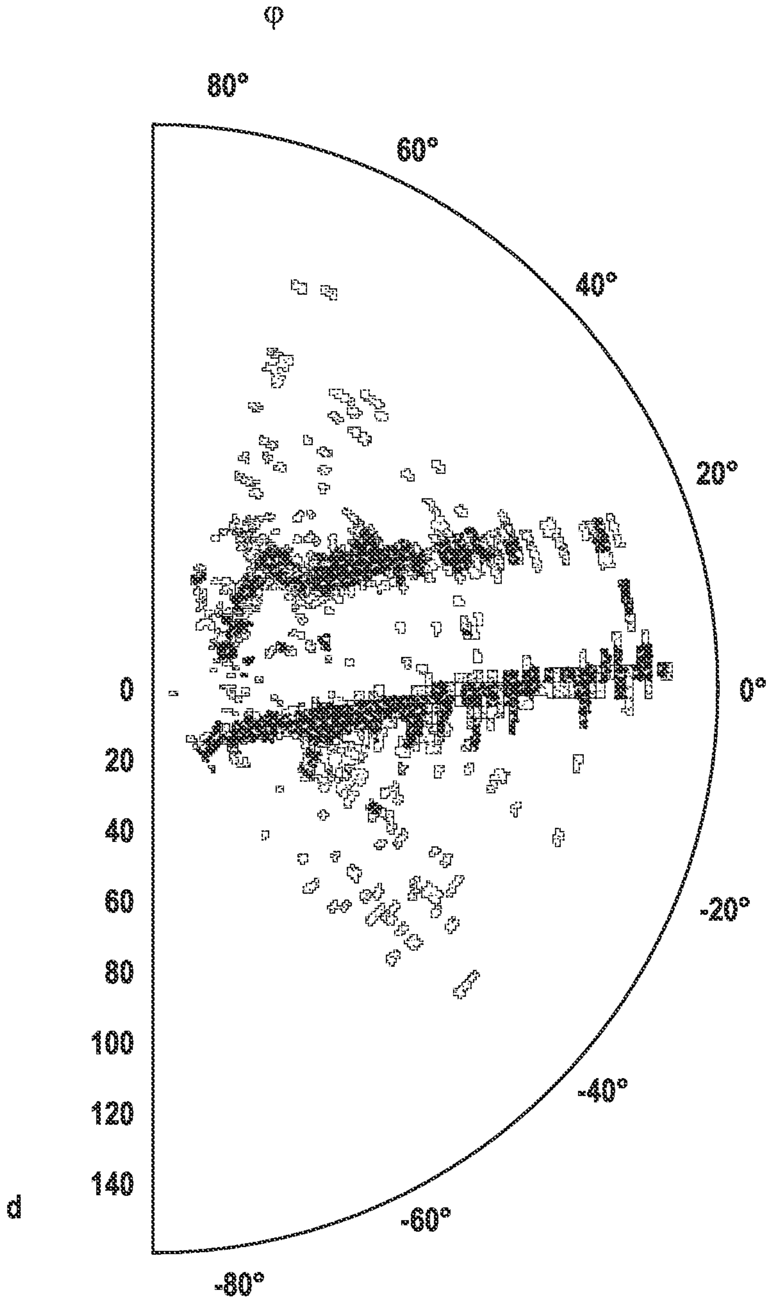
FIG. 3 shows an exemplary occupancy map at a second point in time, according to the present invention.

FIG. 3 shows an exemplary occupancy map at a second point in time. The occupancy map has been generated by sensor 1 which, however, due to external influences was aligned in a twisted manner.

Figure 4:
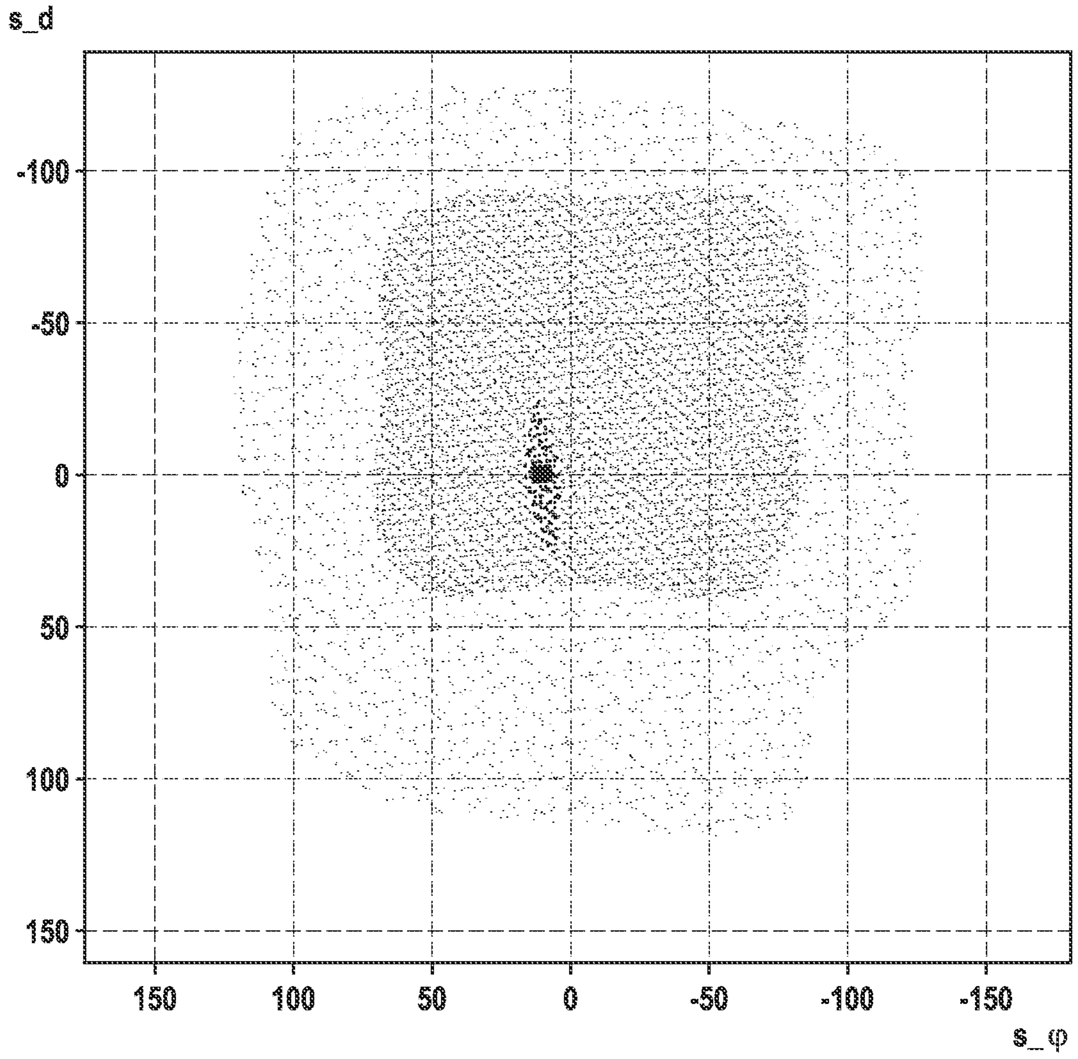
FIG. 4 shows an exemplary representation of a two-dimensional cross-correlation of the occupancy map in FIG. 2 and of the occupancy map in FIG. 3.

FIG. 4 shows an exemplary representation of a two-dimensional cross-correlation of the occupancy map in FIG. 2 and the occupancy map in FIG. 3. A peak is present at a position shifted by an offset, axes s_d and s_φ corresponding to the offset of distance d and the offset of azimuth angle φ. The offset barely corresponds to the misalignment of sensor 1. In the shown case, only a twisting of sensor 1 has occurred, i.e., offset s_φ of azimuth angle φ is not equal to 0, and offset s_d is equal to 0.

Figure 5:
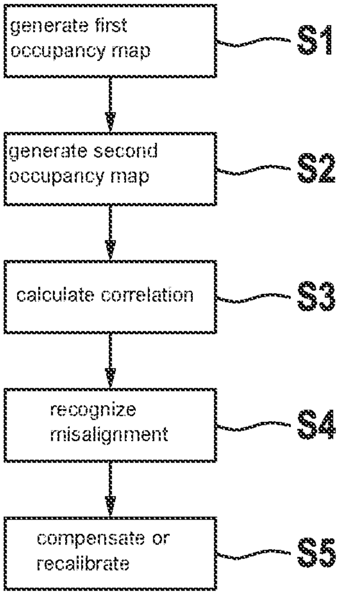
FIG. 5 shows a flow chart of a method for recognizing misalignments of a stationary sensor according to one specific example embodiment of the present invention.

FIG. 5 shows a flowchart of a method for recognizing misalignments of a stationary sensor 1, in particular of the above-described sensor 1.

In a first step S1, a first occupancy map is generated based on first sensor data, which sensor 1 generates at a first point in time. In a second step S2, a second occupancy map is generated based on second sensor data, which sensor 1 generates at a second point in time.

In a step S3, a cross-correlation of the first occupancy map and of the second occupancy map is calculated.

In a step S4, a misalignment of sensor 1 is recognized based on the calculated cross-correlation.

In a further step S5, a compensation of the misalignment or a recalibration of sensor 1 may be carried out based on an offset calculated with the aid of the cross-correlation.

What is claimed is:

1. A method for recognizing misalignments of a stationary sensor, comprising the following steps:

generating a first occupancy map based on first sensor data received at a first point in time, wherein the first occupancy map is a reference occupancy map corresponding to a correctly aligned position of the stationary sensor at the first point in time, the first point in time corresponding to a time of installation of the stationary sensor;

generating a second occupancy map based on second sensor data received at a second point in time that is different from the first point in time;

calculating a cross-correlation of the first occupancy map and of the second occupancy map, wherein a spatial offset is calculated based on the calculated cross-correlation, wherein the cross-correlation is a six-dimensional cross-correlation;

recognizing a misalignment of the stationary sensor based on the calculated cross-correlation, wherein the misalignment of the stationary sensor is recognized when the spatial offset is greater than a predefined threshold value; and calibrating, in response to recognizing the misalignment, the stationary sensor based on the calculated spatial offset.

2. The method as recited in claim 1, wherein the first and second occupancy maps are calculated in a polar representation.

3. The method as recited in claim 1, wherein the stationary sensor generates the first sensor data and/or the second sensor data over a time period of several seconds.

4. The method as recited in claim 1, further comprising:

outputting, in response to recognizing the misalignment of the stationary sensor, a warning signal.

5. The method as recited in claim 1, further comprising:

recognizing a maximum permissible misalignment of the stationary sensor based on the calculated cross-correlation; and deactivating the stationary sensor in response to recognizing the maximum permissible misalignment of the sensor.

6. The method as recited in claim 1, wherein the first point in time, at which the first sensor data is received, is at night.

7. A device configured to recognize misalignments of a stationary sensor, comprising:

an interface configured to receive sensor data from the stationary sensor; and a processing unit configured to:

generate a first occupancy map based on first sensor data received at a first point in time, wherein the first occupancy map is a reference occupancy map corresponding to a correctly aligned position of the stationary sensor at the first point in time, the first point in time corresponding to a time of installation of the stationary sensor;

generate a second occupancy map based on second sensor data received at a second point in time;

calculate a cross-correlation of the first occupancy map and of the second occupancy map, wherein a spatial offset is calculated based on the calculated cross-correlation, wherein the cross-correlation is a six-dimensional cross-correlation;

recognize a misalignment of the stationary sensor based on the calculated cross-correlation, wherein the misalignment of the stationary sensor is recognized when the spatial offset is greater than a predefined threshold value; and calibrate, in response to recognizing the misalignment, the stationary sensor based on the calculated spatial offset.

8. The device as recited in claim 7, where the processing unit is further configured to:

recognize a maximum permissible misalignment of the stationary sensor based on the calculated cross-correlation; and deactivate the stationary sensor in response to recognizing the maximum permissible misalignment of the stationary sensor.

9. The device as recited in claim 7, wherein the first point in time, at which the first sensor data is received, is at night.

10. A stationary sensor, comprising:

a radar sensor or a LIDAR sensor including a device configured to recognize misalignments of the stationary sensor, the device configured to:

generate a first occupancy map based on first sensor data received at a first point in time, wherein the first occupancy map is a reference occupancy map corresponding to a correctly aligned position of the stationary sensor at the first point in time, the first point in time corresponding to a time of installation of the stationary sensor;

generate a second occupancy map based on second sensor data received at a second point in time;

calculate a cross-correlation of the first occupancy map and of the second occupancy map, wherein a spatial offset is calculated based on the calculated cross-correlation, wherein the cross-correlation is a six-dimensional cross-correlation;

recognize a misalignment of the stationary sensor based on the calculated cross-correlation, wherein the misalignment of the stationary sensor is recognized when the spatial offset is greater than a predefined threshold value; and calibrate, in response to recognizing the misalignment, the stationary sensor based on the calculated spatial offset.

11. The stationary sensor as recited in claim 10, wherein the device is further configured to:

recognize a maximum permissible misalignment of the stationary sensor based on the calculated cross-correlation; and deactivate the stationary sensor in response to recognizing the maximum permissible misalignment of the stationary sensor.

12. The stationary sensor as recited in claim 10, wherein the first point in time, at which the first sensor data is received, is at night.

* * * * *